(12) United States Patent
Tal

(10) Patent No.: US 11,775,202 B2
(45) Date of Patent: Oct. 3, 2023

(54) READ STREAM IDENTIFICATION IN A DISTRIBUTED STORAGE SYSTEM

(71) Applicant: EMC IP Holding Company LLC, Hopkinton, MA (US)

(72) Inventor: Doron Tal, Geva Carmel (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/372,737

(22) Filed: Jul. 12, 2021

(65) Prior Publication Data
US 2023/0009138 A1    Jan. 12, 2023

(51) Int. Cl.
*G06F 3/00*    (2006.01)
*G06F 3/06*    (2006.01)

(52) U.S. Cl.
CPC .......... *G06F 3/0655* (2013.01); *G06F 3/0604* (2013.01); *G06F 3/067* (2013.01)

(58) Field of Classification Search
CPC ....... G06F 3/0655; G06F 3/0604; G06F 3/067
See application file for complete search history.

(56) References Cited

U.S. PATENT DOCUMENTS

| | | | |
|---|---|---|---|
| 6,108,775 A * | 8/2000 | Shiell | G06F 9/3851 712/240 |
| 7,165,155 B1 | 1/2007 | Duprey et al. | |
| 7,440,982 B2 | 10/2008 | Lu et al. | |
| 7,444,464 B2 | 10/2008 | Urmston et al. | |
| 8,095,726 B1 | 1/2012 | O'Connell et al. | |
| 8,214,612 B1 | 7/2012 | Natanzon | |
| 8,301,593 B2 | 10/2012 | Hoffmann et al. | |

(Continued)

FOREIGN PATENT DOCUMENTS

WO          2016111954 A1    7/2016
WO   PCT/US2019/024885       1/2020

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Craig S Goldschmidt
(74) *Attorney, Agent, or Firm* — Ryan, Mason & Lewis, LLP

(57) ABSTRACT

An apparatus comprises at least a first storage node of a plurality of storage nodes of a distributed storage system. The first storage node comprises a processor coupled to a memory. The first storage node is configured to receive from a host device a read operation directed to a particular portion of a logical address space of the storage system, where the logical address space is divided among the storage nodes. The first storage node is further configured to determine that the read operation is potentially part of a stream of multiple read operations directed to respective particular portions of the logical address space, and to send, to at least a second one of the storage nodes, an indication of the determination made by the first storage node. The stream of multiple read operations may comprise a sequential read stream directed to respective contiguous portions of the logical address space.

20 Claims, 6 Drawing Sheets

(56) References Cited

U.S. PATENT DOCUMENTS

| | | |
|---|---|---|
| 8,335,899 B1 | 12/2012 | Meiri et al. |
| 8,832,395 B1* | 9/2014 | Watanabe ........... G06F 11/1076 |
| | | 711/161 |
| 9,104,326 B2 | 8/2015 | Frank et al. |
| 9,208,162 B1 | 12/2015 | Hallak et al. |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |
| 9,716,754 B2 | 7/2017 | Swift |
| 9,891,994 B1 | 2/2018 | Schneider et al. |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Stronge et al. |
| 10,394,485 B1 | 8/2019 | Chen et al. |
| 10,437,501 B1 | 10/2019 | Kucherov et al. |
| 10,437,855 B1 | 10/2019 | Stronge et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,558,613 B1 | 2/2020 | Shveidel et al. |
| 10,592,159 B2 | 3/2020 | Kucherov et al. |
| 10,592,161 B1 | 3/2020 | Chen et al. |
| 10,606,519 B1 | 3/2020 | Shveidel |
| 10,635,533 B2 | 4/2020 | Schneider et al. |
| 10,684,915 B2 | 6/2020 | Schneider et al. |
| 10,691,355 B2 | 6/2020 | Kucherov et al. |
| 10,691,373 B2 | 6/2020 | Harduf et al. |
| 10,691,551 B2 | 6/2020 | Meiri et al. |
| 10,698,772 B2 | 6/2020 | Hu et al. |
| 10,705,965 B2 | 7/2020 | Shveidel et al. |
| 10,719,253 B2 | 7/2020 | Alkalay et al. |
| 10,725,855 B2 | 7/2020 | Shani et al. |
| 10,754,559 B1 | 8/2020 | Meiri et al. |
| 10,754,575 B2 | 8/2020 | Stronge |
| 10,754,736 B2 | 8/2020 | Shani et al. |
| 10,761,933 B2 | 9/2020 | Moore et al. |
| 10,783,038 B2 | 9/2020 | Moore et al. |
| 10,817,385 B2 | 10/2020 | Meiri et al. |
| 10,824,512 B2 | 11/2020 | Resnik et al. |
| 10,826,990 B2 | 11/2020 | Kamran et al. |
| 10,831,407 B2 | 11/2020 | Glimcher et al. |
| 10,831,735 B2 | 11/2020 | Schneider et al. |
| 10,838,863 B2 | 11/2020 | Kamran et al. |
| 10,846,178 B2 | 11/2020 | Meiri |
| 10,852,965 B2 | 12/2020 | Glimcher et al. |
| 10,852,974 B2 | 12/2020 | Kucherov et al. |
| 10,852,999 B2 | 12/2020 | Schneider et al. |
| 10,860,234 B2 | 12/2020 | Stronge et al. |
| 10,860,241 B2 | 12/2020 | Meiri et al. |
| 10,866,735 B2 | 12/2020 | Meiri et al. |
| 10,866,760 B2 | 12/2020 | Chen et al. |
| 10,866,934 B1 | 12/2020 | Chen et al. |
| 10,866,969 B2 | 12/2020 | Chen et al. |
| 10,871,960 B2 | 12/2020 | Bashi et al. |
| 10,871,991 B2 | 12/2020 | Alkalay et al. |
| 10,884,650 B1 | 1/2021 | Meiri et al. |
| 10,884,651 B2 | 1/2021 | Chen et al. |
| 10,884,799 B2 | 1/2021 | Alkalay et al. |
| 10,891,195 B2 | 1/2021 | Chen |
| 10,901,847 B2 | 1/2021 | Shani et al. |
| 10,909,001 B1 | 2/2021 | Kucherov et al. |
| 10,951,699 B1 | 3/2021 | Sayles et al. |
| 11,036,602 B1 | 6/2021 | Tal |
| 2007/0022121 A1 | 1/2007 | Bahar et al. |
| 2008/0279462 A1 | 11/2008 | Celi, Jr. |
| 2009/0132955 A1 | 5/2009 | Garg et al. |
| 2009/0276593 A1 | 11/2009 | Jacobson et al. |
| 2010/0179941 A1 | 7/2010 | Agrawal et al. |
| 2011/0022566 A1 | 1/2011 | Beaverson et al. |
| 2011/0225123 A1 | 9/2011 | D'Souza et al. |
| 2012/0124282 A1 | 5/2012 | Frank et al. |
| 2013/0305002 A1 | 11/2013 | Hallak et al. |
| 2013/0325824 A1 | 12/2013 | Shoens |
| 2014/0181016 A1 | 6/2014 | Whitehead et al. |
| 2014/0244935 A1 | 8/2014 | Ezra et al. |
| 2014/0289492 A1* | 9/2014 | Ranjith Reddy ..... G06F 3/0643 |
| | | 711/170 |
| 2014/0361971 A1* | 12/2014 | Sala .................. G06F 3/013 |
| | | 345/156 |
| 2015/0378766 A1 | 12/2015 | Beveridge et al. |
| 2015/0378785 A1 | 12/2015 | Tarasuk-Levin et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0345207 A1 | 11/2016 | Kwak et al. |
| 2017/0075842 A1 | 3/2017 | Su et al. |
| 2017/0185529 A1 | 6/2017 | Chhabra et al. |
| 2017/0192857 A1 | 7/2017 | Meiri et al. |
| 2018/0095873 A1 | 4/2018 | Nakagoe et al. |
| 2018/0275919 A1* | 9/2018 | Chirumamilla ....... G06F 3/0656 |
| 2019/0303490 A1 | 10/2019 | Chen et al. |
| 2019/0370354 A1 | 12/2019 | Kucherov et al. |
| 2019/0370355 A1 | 12/2019 | Kucherov et al. |
| 2019/0370356 A1 | 12/2019 | Kucherov et al. |
| 2019/0370357 A1 | 12/2019 | Kucherov et al. |
| 2019/0392060 A1 | 12/2019 | Meiri et al. |
| 2020/0026616 A1 | 1/2020 | Hu et al. |
| 2020/0097174 A1 | 3/2020 | Moore et al. |
| 2020/0097363 A1 | 3/2020 | Moore et al. |
| 2020/0097393 A1 | 3/2020 | Moore et al. |
| 2020/0125276 A1 | 4/2020 | Shani et al. |
| 2020/0218601 A1 | 7/2020 | Schneider et al. |
| 2020/0218610 A1 | 7/2020 | Schneider et al. |
| 2020/0225849 A1 | 7/2020 | Meiri et al. |
| 2020/0226023 A1 | 7/2020 | Meiri |
| 2020/0226145 A1 | 7/2020 | Meiri |
| 2020/0233704 A1 | 7/2020 | Alkalay et al. |
| 2020/0233705 A1 | 7/2020 | Alkalay et al. |
| 2020/0233881 A1 | 7/2020 | Harduf et al. |
| 2020/0242130 A1 | 7/2020 | Chen et al. |
| 2020/0249868 A1 | 8/2020 | Glimcher et al. |
| 2020/0249869 A1 | 8/2020 | Glimcher et al. |
| 2020/0250089 A1 | 8/2020 | Kamran et al. |
| 2020/0250144 A1 | 8/2020 | Natanzon et al. |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |
| 2020/0301784 A1 | 9/2020 | Chen |
| 2020/0310649 A1 | 10/2020 | Chen et al. |
| 2020/0310654 A1 | 10/2020 | Meiri et al. |
| 2020/0326877 A1 | 10/2020 | Chen et al. |
| 2020/0327024 A1 | 10/2020 | Alkalay et al. |
| 2020/0341641 A1 | 10/2020 | Kucherov et al. |
| 2020/0341682 A1 | 10/2020 | Kucherov et al. |
| 2020/0341749 A1 | 10/2020 | Bashi et al. |
| 2020/0364106 A1 | 11/2020 | Chen et al. |
| 2020/0401314 A1 | 12/2020 | Chen et al. |
| 2020/0401315 A1 | 12/2020 | Chen et al. |
| 2021/0019229 A1 | 1/2021 | Kucherov et al. |
| 2021/0034267 A1 | 2/2021 | Kucherov et al. |
| 2021/0124494 A1 | 4/2021 | Chen et al. |
| 2021/0124657 A1 | 4/2021 | Kamran et al. |
| 2021/0132839 A1 | 5/2021 | Kamran et al. |
| 2021/0157695 A1 | 5/2021 | Tal |

FOREIGN PATENT DOCUMENTS

| | | | |
|---|---|---|---|
| WO | PCT/US2019/024900 | | 1/2020 |
| WO | 2020204880 | A1 | 10/2020 |
| WO | 2020204882 | A1 | 10/2020 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

(56) References Cited

OTHER PUBLICATIONS

EMC Corporation, "Introduction to XtremIO Virtual Copies," White Paper, Mar. 2016, 39 pages.
EMC Corporation, "XtremIO Data Protection (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Dell EMC, "PowerMax OS," Dell EMC PowerMax Family Product Guide, May 2019, 192 pages.
Dell EMC, "Dell EMC VxRack FLEX," Dell EMC Product Overview, 2018, 5 pages.
NVM Express, "NVM Express, Revision 1.3," NVM Express, May 1, 2017, 282 pages.

\* cited by examiner

1. Each controller maintains a HINTS hash table with:
   key: (volume, LBA)
   value: confidence, timestamp
2. Upon receiving a read to (volume, LBA) of size >= 128KB
   Continue:
   Next_LBA = LBA + READ_Size
   Controller_ID = controller_mapping(volume, Next_LBA)
   If (volume, Next_LBA) in HINTS:
       HINTS[volume, Next_LBA].confidence =
       HINTS[(volume, Next_LBA)].confidence + 1
   Else:
       HINTS[volume, Next_LBA].confidence = 0
   Send hint to controller(Controller_ID):
       (volume, Next_LBA, confidence)
3. Upon receiving hint (volume, Next_LBA, confidence)
   If confidence > high_enough_confidence:
       Perform read_ahead
   Insert hint into HINTS: (key = (volume, Next_LBA), value = (confidence, timestamp=now))
4. Background scanner scans HINTS and removes old entries

FIG. 4

READ STREAM IDENTIFICATION IN A DISTRIBUTED STORAGE SYSTEM

FIELD

The field relates generally to information processing systems, and more particularly to storage in information processing systems.

BACKGROUND

A wide variety of different types of distributed storage systems are known. Such storage systems include clustered storage systems as well as other types of storage systems that are distributed across multiple storage nodes. These distributed storage systems include so-called "scale-out" storage systems that can be easily expanded by adding more storage nodes to the system. Distributed storage systems can include a potentially large number of distributed storage nodes that are interconnected by a mesh network or other type of communication network. Each such storage node of a distributed storage system typically processes input-output (IO) operations from one or more host devices and in processing those IO operations runs various storage application processes that generally involve interaction of that storage node with one or more other ones of the storage nodes.

SUMMARY

Illustrative embodiments provide techniques for read stream identification in a distributed storage system. For example, some embodiments are configured to allow multiple storage nodes of a scale-out storage system or other type of distributed storage system to collaborate with one another to identify a sequential read stream that includes reads of contiguous portions of a logical address space assigned to different ones of the storage nodes. Other embodiments allow the storage nodes to collaborate to identify non-sequential read streams that exhibit various types of repetitive patterns in their read operations.

Such embodiments advantageously allow the storage nodes to more accurately and efficiently control their prefetching operations in the presence of a likely read stream, in a coordinated manner, thereby reducing unnecessary prefetching that might otherwise be performed based on false stream identification, and improving overall performance of the distributed storage system.

In one embodiment, an apparatus comprises at least a first storage node of a plurality of storage nodes of a distributed storage system, with the first storage node comprising a processor coupled to a memory. The first storage node is configured to receive from a host device a read operation directed to a particular portion of a logical address space of the storage system, where the logical address space is divided among the storage nodes. The first storage node is further configured to determine that the read operation is potentially part of a stream of multiple read operations directed to respective particular portions of the logical address space, and to send, to at least a second one of the storage nodes, an indication of the determination made by the first storage node.

As indicated above, in some embodiments, the stream of multiple read operations comprises a sequential read stream that includes read operations directed to respective contiguous portions of the logical address space.

Other embodiments can be configured to identify particular types of non-sequential read streams, such as, for example, read streams that read every other fixed-size portion of the logical address space, every third fixed-size portion, and so on.

These and other illustrative embodiments include, without limitation, apparatus, systems, methods and processor-readable storage media.

BRIEF DESCRIPTION OF THE DRAWINGS

FIG. 4 shows example pseudocode for a read stream identification process in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
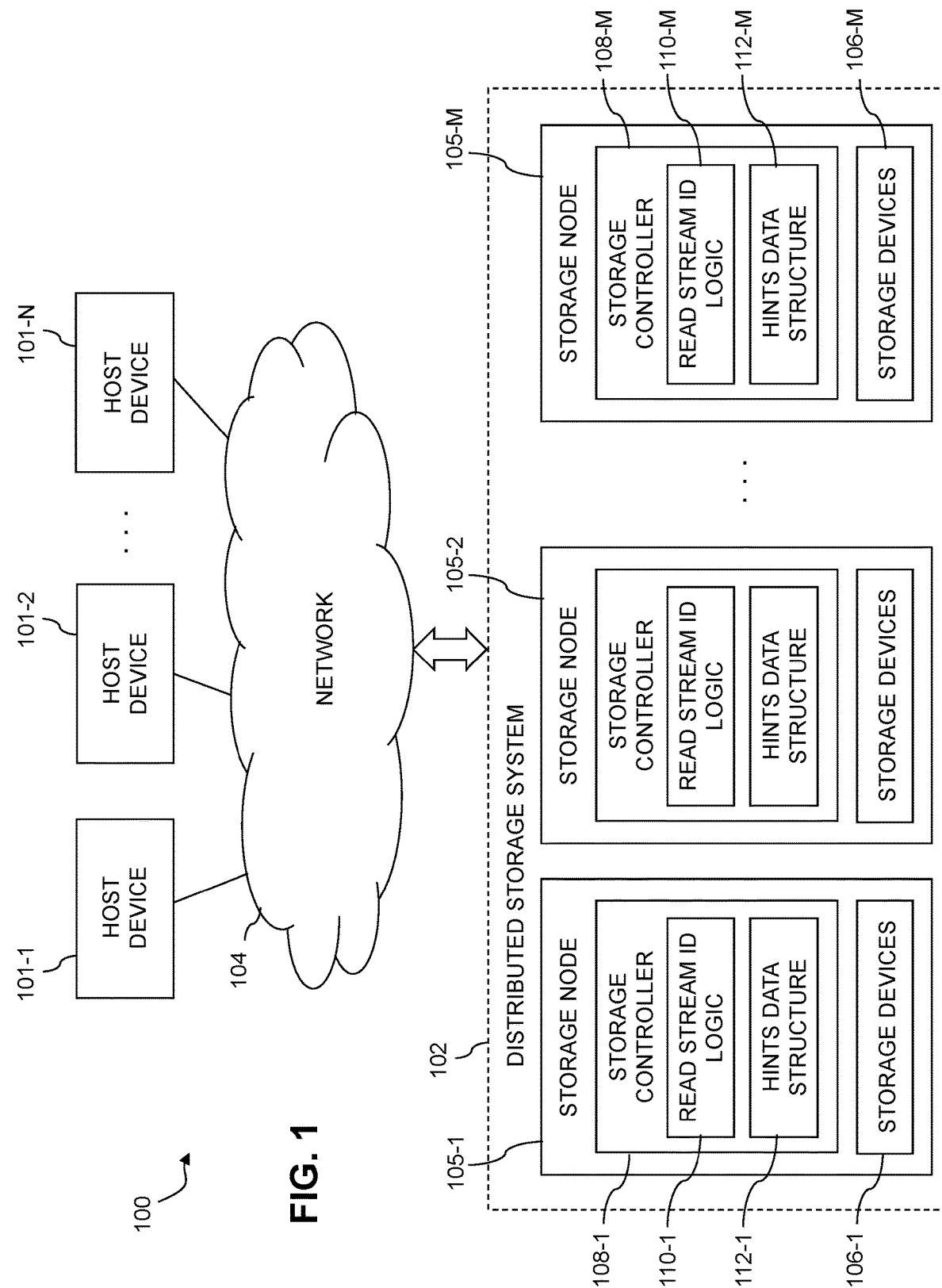
FIG. 1 is a block diagram of an information processing system comprising a distributed storage system incorporating functionality for read stream identification in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a distributed storage system 102 shared by the host devices 101. The host devices 101 and distributed storage system 102 are configured to communicate over a network 104. The distributed storage system 102 more particularly comprises storage nodes 105-1, 105-2, . . . 105-M, collectively referred to herein as storage nodes 105. The values N and M in this embodiment denote arbitrary integer values that are assumed to be greater than or equal to three, although other values such as N=1 or M=2 can be used in other embodiments.

The storage nodes 105 collectively form the distributed storage system 102, which is one possible example of what is more generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

It is assumed that the distributed storage system 102 provides a logical address space that is "sharded" or otherwise divided among the storage nodes 105, such that different ones of the storage nodes 105 store the data for respective different portions of the logical address space. For example, the logical address space in illustrative embodiments may be divided among the storage nodes 105 in accordance with a specified sharding granularity in which different logical address space shards, each of a particular size given by the sharding granularity, are assigned to different ones of the storage nodes 105. Accordingly, in these and other similar distributed storage system arrangements, different ones of the storage nodes 105 have responsibility for different portions of the logical address space.

Each of the storage nodes 105 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (TO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are being concurrently processed in the system in some embodiments are referred to herein as "in-flight" IOs that have been admitted by the storage nodes 105 to further processing within the system 100. The storage nodes 105 are illustratively configured to queue IO operations arriving from one or more of the host devices 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms.

The host devices 101 are illustratively configured to write data to and read data from the distributed storage system 102 comprising storage nodes 105 in accordance with applications executing on those host devices 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 in some embodiments is assumed to comprise a portion of a global computer network such as the Internet, although additional or alternative types of networks can be part of the network 104, including a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage node 105-1 comprises a plurality of storage devices 106-1 and an associated storage controller 108-1. The storage devices 106-1 store metadata pages and user data pages associated with one or more storage volumes of the distributed storage system. The storage volumes illustratively comprise respective logical units (LUNs) or other types of logical storage volumes. The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-M comprises a plurality of storage devices 106-M and an associated storage controller 108-M. The storage devices 106-M store metadata pages and user data pages associated with one or more storage volumes of the distributed storage system 102, such as the above-noted LUNs. The storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 105 via remote interfaces. For example, it is assumed in some embodiments disclosed herein that each of the storage devices 106 on a given one of the storage nodes 105 can be accessed by the given storage node via its local interface, or by any of the other storage nodes via a remote direct memory access (RDMA) interface. A given storage application executing on the storage nodes 105 illustratively requires that all of the storage nodes 105 be able to access all of the storage devices 106. Such access to local persistent storage of each node from the other storage nodes can be performed, for example, using the RDMA interfaces with the other storage nodes, although numerous other arrangements are possible.

The storage controller 108-1 of first storage node 105-1 in the FIG. 1 embodiment includes read stream identification logic 110-1 and hints data structure 112-1. It can also include additional elements not explicitly shown, such as journal destaging logic and other logic instances for processing IO operations.

The other storage controllers 108 of the other storage nodes 105 are each configured in a manner similar to storage controller 108-1 of storage node 105-1. Accordingly, for example, the storage controller 108-M of storage node 105-M includes read stream identification logic 110-M and hints data structure 112-M. The storage controller 108-M, like the storage controller 108-1, can also include additional elements, such as journal destaging logic and other logic instances for processing IO operations.

The instances of read stream identification logic 110-1 through 110-M are collectively referred to herein as read stream identification logic 110. The read stream identification logic 110 of the storage nodes 105 controls performance of a process that involves collaboration between the storage nodes 105 to identify sequential read streams or other types of read streams having repetitive patterns of read operations, so as to facilitate accurate and efficient prefetching of read data in each of the storage nodes 105.

Such read stream identification illustratively involves maintaining and utilizing the hints data structures 112 of the respective storage nodes 105. The hints data structures 112 are examples of what are more generally referred to as "data structures" maintained by the respective corresponding storage nodes 105, and can include tables or other types of data structures. Such data structures are utilized by the corresponding instances of read stream identification logic 110 in implementing read stream identification functionality in the distributed storage system, as is described in more detail elsewhere herein.

The storage controllers 108 are illustratively configured to control performance of at least a portion of a process as described herein for read stream identification using read stream identification logic 110 of storage nodes 105. For example, the storage controllers 108 and their respective instances of read stream identification logic 110 illustratively implement at least portions of the read stream identification process to be described below in conjunction with the flow diagram of FIG. 3. This process is an example of an algorithm implemented by the instances of read stream identification logic 110 deployed within the storage controllers 108. Another such algorithm is shown in the example pseudocode of FIG. 4.

The storage controllers 108 of the storage nodes 105 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 105 of the distributed storage system of FIG. 1.

In some embodiments, the storage nodes 105 of the distributed storage system collectively provide a scale-out storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 105 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

Some embodiments disclosed herein are configured to utilize one or more RAID arrangements to store data across the storage devices 106 in each of one or more of the storage nodes 105 of the distributed storage system 102.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage controllers 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes an array of n different "disks" denoted 1 through n, each a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the disks in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments.

In some embodiments, the storage nodes 105 of the distributed storage system of FIG. 1 are connected to each other in a full mesh network, and are collectively managed by a system manager. A given set of local persistent storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The distributed storage system of FIG. 1 implements functionality for read stream identification in the storage nodes 105, utilizing instances of read stream identification logic 110 of the storage controllers 108 of respective ones of the storage nodes 105, as will now be described in more detail.

As indicated previously, the storage nodes 105 of the distributed storage system of FIG. 1 process IO operations from one or more host devices 101 and in processing those IO operations run various storage application processes that generally involve interaction of that storage node with one or more other ones of the storage nodes.

In some use cases, the IO operations received in the storage nodes 105 illustratively comprise what are referred to herein as "read streams." A given such read stream illustratively comprises, for example, multiple read operations collectively comprising a potentially lengthy sequence of relatively large reads, where "relatively large" generally denotes having a read size above a certain designated minimum size potentially indicative of a read stream, and therefore greater than typical read sizes for reads that are not part of a read stream. Such read patterns are common in use cases such as data backup, cloning and scanning, as well as numerous others. It is very important in these and other use cases to complete the read operations as quickly as possible, as the read latency governs the overall time required to complete the data backup, cloning, scanning or other use case.

Conventional approaches typically utilize data prefetching techniques, also referred to as read-ahead techniques, in an attempt to decrease the read latency of the read operations of the read stream, but such approaches do not work properly in a distributed storage system in which a logical address space is "sharded" or otherwise divided between multiple storage nodes, because contiguous portions of the logical address space are often associated with different ones of the storage nodes of the distributed storage system. The implementation of conventional read-ahead techniques within each of the individual distributed storage nodes is generally not useful, and in fact can undermine system performance by causing each storage node to perform unnecessary prefetching operations.

Illustrative embodiments herein overcome these and other drawbacks of conventional practice by configuring multiple storage nodes of a scale-out storage system or other type of distributed storage system to collaborate with one another to identify a sequential read stream that includes reads of contiguous portions of a logical address space assigned to different ones of the storage nodes. It is to be appreciated that the disclosed techniques are not limited to identification of sequential read streams, but can additionally or alternatively configure the storage nodes to collaborate to identify non-sequential read streams that exhibit various types of repetitive patterns in their read operations.

Figure 2:
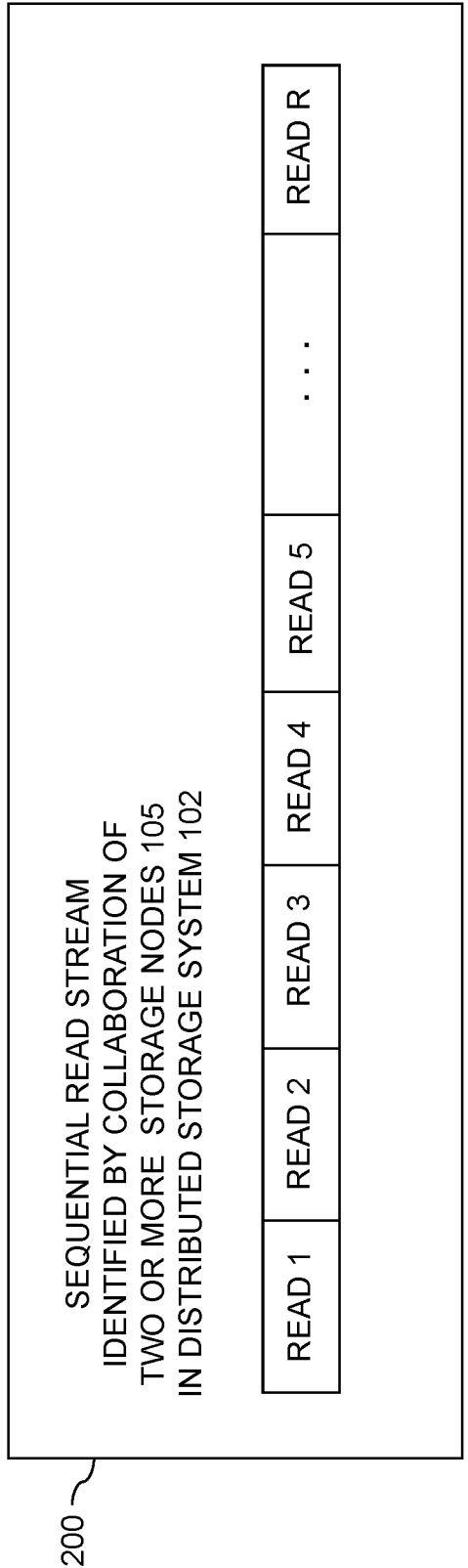
FIG. 2 shows an example of a sequential read stream in an illustrative embodiment.

FIG. 2 shows an example of a sequential read stream 200 that is identified by collaboration among the storage nodes 105 in the distributed storage system 102 in an illustrative embodiment. In the sequential read stream 200, a plurality of read operations including read operations denoted Read 1, Read 2, Read 3, Read 4, Read 5, . . . Read R are issued by one of the host devices 101 to the distributed storage system 102 in conjunction with one of the above-noted use cases, such as backup, cloning or scanning of at least one LUN or other logical storage volume of the distributed storage system 102. It is assumed in some embodiments that a given read r+1 within the sequential read stream 200, where r=1, 2, . . . R, may be received only after read r is completed, such that the latency of the reads is critical to the performance of the backup, cloning or scanning application of the host device.

In some embodiments, the storage nodes 105 are each configured to send one another "hints" or other indications that it has processed a read operation that is likely to be part of a read stream such as that shown in FIG. 2. The storage nodes 105 can thus collectively detect the likely presence of a read stream, and adapt their prefetching operations accordingly, resulting in reduced read latency for the read operations of the read stream, and enhanced overall performance of the distributed storage system 102.

For example, assume that the sequential read stream 200 of FIG. 2 comprises a sequence of R reads directed to respective contiguous 1 MegaByte (MB) portions of the logical address space of the distributed storage system 102. Assuming that the sharding granularity of the logical address space is also 1 MB, none of the storage nodes 105 will serve two consecutive reads in the read stream. However, because an entire shard is read in each of the read operations, a given one of the storage nodes 105 processing such a read operation can detect this condition and provide a corresponding hint to another one of the storage nodes 105 that would be expected to process the next read operation of the potential read stream. If such a read operation arrives to that other storage node, an associated confidence value is increased, and a hint is similarly provided to the next storage node, and so on.

Once the confidence value exceeds a threshold at a given one of the storage nodes 105, the given storage node will perform a read-ahead based on the read stream by prefetching the read metadata and/or the read data for one or more of the next read operations of the read stream that are to be processed by that storage node. The prefetching typically involves the storage controller of the given storage node retrieving the read metadata and/or read data from one or more of its associated storage devices and storing it in a local cache or other memory within or otherwise accessible to the storage controller, such that the corresponding read operation once received can be serviced very quickly using the read metadata and/or read data in memory.

Such arrangements advantageously allow the storage nodes 105 to more accurately and efficiently control their prefetching operations in the presence of a likely read stream, in a coordinated manner, thereby reducing unnecessary prefetching that might otherwise be performed based on false stream identification, and improving overall performance of the distributed storage system 102.

Although the foregoing example was based on detection of a likely read stream comprising read operations directed to data having the same size as the sharding granularity of the logical address space, the disclosed read stream identification techniques can be adapted in a straightforward manner to detection of likely read streams in which the read size is smaller than or greater than the sharding granularity. Other embodiments can be configured to identify particular types of non-sequential read streams, such as, for example, read streams that read every other 1 MB of the logical address space, every third 1 MB portion, and so on, and similarly for other fixed-size portions of the logical address space.

Such embodiments recognize that the size of the data targeted by a read operation relative to the sharding granularity can be used to identify potential read streams within the distributed storage system 102 by implementing collaboration among the storage nodes 105, even though the storage nodes 105 might not otherwise be individually able to identify potential read streams absent the collaboration.

Additional details regarding illustrative embodiments will now be described with reference again to the distributed storage system 102 of FIG. 1. As indicated above, the distributed storage system 102 advantageously overcomes problems of conventional practice arising from processing of sequential read streams and other types of read streams exhibiting repetitive patterns by implementing read stream identification within the distributed storage system 102. For example, the distributed storage system of FIG. 1 is illustratively configured to provide read stream identification using instances of read stream identification logic 110 of respective ones of the storage nodes 105.

In some embodiments, the distributed storage system 102 comprising storage nodes 105 implements read stream identification in the following exemplary manner. In the description below, first and second storage nodes of the storage nodes 105 are described as implementing certain functionality. The first and second storage nodes can be any two of the storage nodes 105, and in the following description are illustratively storage node 105-1 and storage node 105-2, but all of the storage nodes 105 are assumed to implement substantially the same read stream identification functionality relative to one another.

The first storage node 105-1 is illustratively configured to receive from one of the host devices 101 a read operation directed to a particular portion of a logical address space of the distributed storage system 102, where the logical address space is divided among the storage nodes 105 as previously described. The first storage node 105-1 is further configured to determine that the read operation is potentially part of a stream of multiple read operations directed to respective particular portions of the logical address space, and to send to at least a second one of the storage nodes 105, illustratively storage node 105-2 but potentially any of the other storage nodes 105, an indication of the determination made by the first storage node 105-1.

The logical address space is illustratively divided among the storage nodes 105 in accordance with a specified sharding granularity in which different logical address space shards, each of a particular size given by the sharding granularity, are assigned to different ones of the storage nodes 105. Other types of sharding or division of the logical address space among the storage nodes 105 can be used.

In some embodiments, determining that the read operation is potentially part of the stream of read operations comprises determining that the read operation exhibits a predetermined relationship to the sharding granularity.

For example, the predetermined relationship may comprise the particular portion of the logical address space to which the read operation is directed having a size that is the same as the particular size given by the sharding granularity.

In some embodiments, the first storage node 105-1 sending to at least a second one of the storage nodes 105 an indication of the determination made by the first storage node 105-1 illustratively comprises identifying the second storage node 105-2 as a particular one of the storage nodes 105 other than the first storage node 105-1 that is assigned a next contiguous portion of the logical address space, and sending the indication of the determination to the second storage node 105-2.

The indication of the determination made by the first storage node 105-1 illustratively comprises a read stream identification hint generated by the first storage node 105-1 for a next contiguous portion of the logical address space. The term "hint" as used herein is intended to be broadly construed, so as to encompass, for example, a wide variety of different types of information that can convey from one of the storage nodes 105 to another one of the storage nodes 105 an indication of a potential read stream.

In some embodiments, determining that the read operation is potentially part of a stream of multiple read operations directed to respective particular portions of the logical address space illustratively comprises identifying a next contiguous portion of the logical address space having a same size as the particular portion of the logical address space to which the read operation is directed, and determining a confidence value for the next contiguous portion. The indication sent by the first storage node 105-1 to at least the second storage node 105-2 illustratively comprises the confidence value determined for the next contiguous portion, although numerous other types of hints or other indications can be used.

In some embodiments, the first storage node 105-1 determines the above-noted confidence value by determining whether or not the next contiguous portion has a corresponding entry in the hints data structure 112-1 maintained by the first storage node 105-1. Responsive to the next contiguous portion having a corresponding entry in the hints data structure 112-1, the first storage node 105-1 updates the confidence value and stores the updated confidence value in the corresponding entry. Responsive to the next contiguous portion not having a corresponding entry in the hints data structure 112-1, the first storage node 105-1 creates a corresponding entry in the hints data structure 112-1, initializes the confidence value and stores the initialized confidence value in the corresponding entry.

The indication of the determination made by the first storage node 105-1 is illustratively utilized in the second storage node 105-2 to control prefetching of at least one of read metadata and read data in the second storage node 105-2.

In some embodiments, the first storage node 105-1 is illustratively further configured to receive from another one of the storage nodes 105, such as the second storage node 105-2 or another one of the storage nodes 105, an indication of a determination made by that other storage node that a read operation received by that other storage node is potentially part of a stream of multiple read operations directed to respective particular portions of the logical address space. The first storage node 105-2 illustratively controls prefetching of at least one of read metadata and read data in the first storage node 105-1 based at least in part on the indication received from the other storage node.

By way of example, controlling prefetching of at least one of read metadata and read data in the first storage node 105-1 based at least in part on the indication received from the other storage node illustratively comprises comparing a confidence value in the indication received from the other storage node to a threshold, and initiating the prefetching of at least one of read metadata and read data in the first storage node 105-1 responsive to the confidence value exceeding the threshold.

In some embodiments, determining that the read operation is potentially part of a stream of multiple read operations directed to respective particular portions of the logical address space comprises determining that the read operation is potentially part of a sequential stream of multiple read operations directed to respective contiguous portions of the logical address space. Other embodiments can detect likely read streams that comprise non-sequential streams exhibiting particular repetitive patterns.

The first storage node 105-1 is illustratively configured to maintain the hints data structure 112-1. For example, the hints data structure 112-1 can comprise a plurality of entries, with the entries being indexed based at least in part on logical block addresses (LBAs) in the logical address space, and the entries comprising at least respective confidence values for corresponding portions of the logical address space. In such an embodiment, determining that the read operation is potentially part of a stream of multiple read operations directed to respective particular portions of the logical address space illustratively comprises making the determination utilizing one or more of the entries of the hints data structure 112-1.

It is assumed in some embodiments that each of the storage nodes 105 incorporates substantially the same read stream identification functionality using its corresponding instances of the read stream identification logic 110 and hints data structures 112. Accordingly, the read stream identification functionality in the distributed storage system 102 is illustratively implemented at least in part by or under the control of the instances of read stream identification logic 110 using the hints data structures 112 in the storage controllers 108 of the respective storage nodes 105. The other storage nodes 105 of the distributed storage system 102 are assumed to operate in a manner similar to that described above for the first and second storage nodes 105, illustratively storage nodes 105-1 and 105-2.

In some embodiments, while a given read stream will typically sequence through different LBAs mapped to different ones of the storage nodes 105, each of the storage nodes 105 illustratively maintains in its corresponding instance of the hints data structure 112 those particular hints that are relevant to its assigned portion of the logical address space. This advantageously avoids flooding the system with non-relevant hints. Accordingly, when a given one of the storage nodes 105 (e.g., the first storage node) identifies a potential read stream, it will forward the corresponding hint to another one of the storage nodes 105 that is assigned the portion of the logical address space that includes the next expected part of the potential read stream. Thus, the hints data structures 112 within the respective storage nodes 105 will contain the hints for their respective corresponding assigned portions of the logical address space, although other arrangements are possible.

These and other features of illustrative embodiments disclosed herein are examples only, and should not be construed as limiting in any way. Other types of read stream identification may be used in other embodiments, and the term "read stream identification" as used herein is intended to be broadly construed.

An additional example of an illustrative process for implementing at least some of the above-described read stream identification functionality will be provided below in conjunction with the flow diagram of FIG. 3. A more detailed pseudocode implementation of a read stream identification process will be described in conjunction with FIG. 4.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

As another example, the storage nodes 105 in some embodiments are part of a distributed content addressable storage system in which logical addresses of data pages are mapped to physical addresses of the data pages in the storage devices 106 using respective hash digests, hash handles or other content-based signatures that are generated from those data pages using a secure hashing algorithm. A wide variety of other types of distributed storage systems can be used in other embodiments.

Also, the term "storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the storage nodes using well-known communication protocols such as TCP/IP and RDMA. For example, respective sets of IP links used in data transfer and corresponding messaging could be associated with respective different ones of the routing modules.

The particular features described above in conjunction with FIGS. 1 and 2 should not be construed as limiting in any way, and a wide variety of other distributed implementations of storage nodes 105 and their associated read stream identification logic 110 and corresponding hints data structures 112 are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated host devices 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the host devices 101 and the storage nodes 105 to reside in different data centers. Numerous other distributed implementations of the storage nodes 105 and their respective associated sets of host devices 101 are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, distributed storage system 102, network 104, storage nodes 105, storage devices 106, storage controllers 108, read stream identification logic 110 and hints data structures 112 can be used in other embodiments.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of read stream identification functionality as disclosed herein can be implemented in one or more host devices, or partially in a host device and partially in a storage system. Accordingly, illustrative embodiments are not limited to arrangements in which all such functionality is implemented in a storage system, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 3, which implements a process for implementing read stream identification in a distributed storage system. This process may be viewed as an example algorithm implemented at least in part by the storage controllers 108 of the respective storage nodes 105 of the distributed storage system of FIG. 1. For example, such an algorithm is illustratively carried out at least in part utilizing one or more instances of read stream identification logic 110 in respective ones of the storage controllers 108 of the storage nodes 105. These and other algorithms disclosed herein are more generally applicable to a wide variety of other distributed storage systems each comprising two or more storage nodes.

Figure 3:
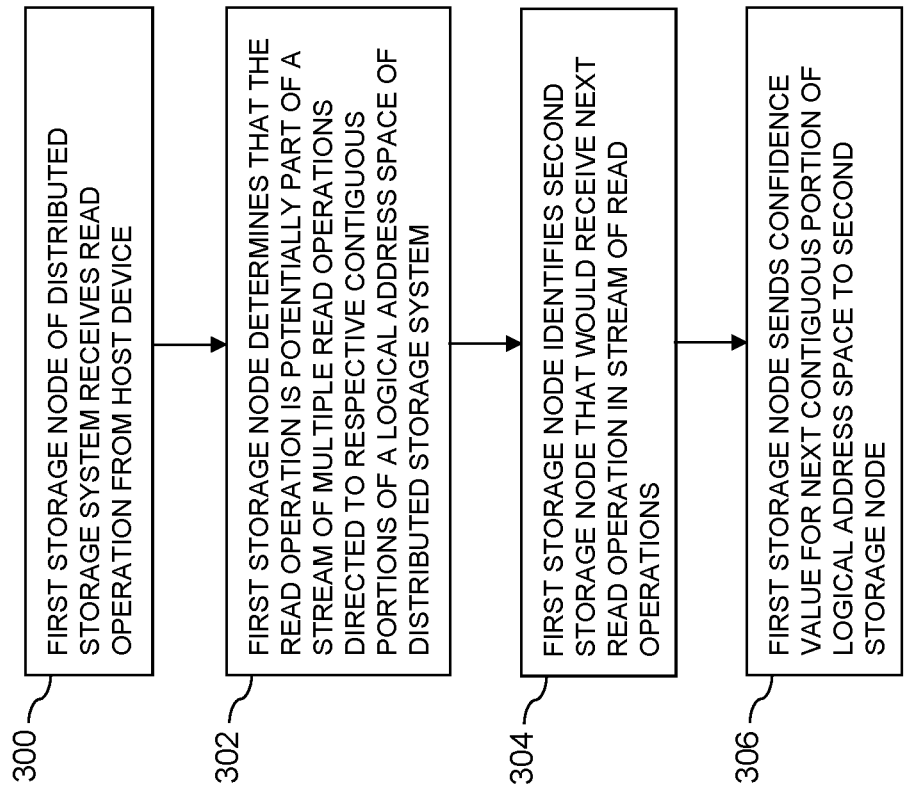
FIG. 3 is a flow diagram of a read stream identification process in an illustrative embodiment.

Referring now to FIG. 3, the read stream identification process as illustrated includes steps 300 through 306, and is implemented across multiple storage nodes of a distributed storage system. It is assumed that the steps of the process implement read stream identification functionality across multiple storage nodes, such as two or more of the storage nodes 105 of FIG. 1, or in other types and arrangements of storage nodes in other distributed storage systems. Different instances of the read stream identification process are illustratively performed in parallel by different ones of the storage nodes 105, so as to permit the storage nodes 105 to collaborate in identifying potential read streams.

In step 300, a first storage node of a distributed storage system comprising at least first and second storage nodes receives a read operation from a host device.

In step 302, the first storage node determines that the read operation is potentially part of a stream of multiple read operations directed to respective contiguous portions of a logical address space of the distributed storage system.

In step 304, the first storage node identifies a second storage node that would receive the next read operation in the stream of read operations.

In step 306, the first storage node sends a confidence value for the next contiguous portion of the logical address space to the second storage node.

Steps 300 through 306 are illustratively repeated for multiple iterations by each of the storage nodes of the distributed storage system. Such an arrangement allows the storage nodes to collaborate with one another to reach a threshold confidence level that a read stream has been identified, and to adapt their prefetching operations accordingly.

The steps of the FIG. 3 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for implementing read stream identification in a distributed storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different read stream identification processes for respective different pairs of storage nodes within a distributed storage system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage node or storage controller can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, storage controllers and other system components may be implemented at least in part using processing devices of such processing platforms. For example, respective logic instances, data structures or other processing modules of a storage controller can be implemented in respective containers running on respective ones of the processing devices of a processing platform.

FIG. 4 illustrates pseudocode for an additional example of read stream identification of the type described in conjunction with the process of FIG. 3. The pseudocode in this example is performed by storage controllers of respective storage nodes, such as storage controllers 108 of storage nodes 105, utilizing their respective instances of read stream identification logic 110 and hints data structures 112. The storage controllers 108 in this example are referred to as simply "controllers" and the hints data structures 112 are more particularly implemented as respective HINTS hash tables. The pseudocode includes four primary steps, denoted as steps 1 through 4 in the figure. References to first and second controllers below are arbitrary, and can be any two of the controllers, with the assumption that all of the controllers implement substantially the same read stream identification functionality.

In step 1, each controller maintains a HINTS hash table that has as its key a combination of a volume name or identifier ("volume") and a logical block address (LBA) in a logical address space, and for each such key a corresponding value that includes a confidence and a timestamp. The confidence is a measure of the likelihood that a particular read of the corresponding LBA is part of a read stream, as determined by one or more of the storage nodes. Although a HINTS hash table is used in this example, other types of hints data structures having other types of entries can be used in other embodiments.

In step 2, upon receiving a read to (volume, LBA) of size greater than or equal to a designated minimum size, illustratively 128 KB although other sizes can be used, a first controller computes the next contiguous portion of the logical address space as Next_LBA=LBA+READ_Size, where READ_Size in this example is the size of the received read to (volume, LBA). The first controller then determines the identifier of a second controller that is assigned that next contiguous portion of the logical address space, using a controller_mapping function that maps different portions of the logical address space to different controllers, as follows: Controller_ID=controller_mapping(volume, Next_LBA). The first controller also updates its HINTS hash table in the manner shown in the figure. If the HINTS hash table includes an entry for (volume, Next_LBA), the confidence in the entry is incremented by one, and otherwise an entry is created with an initial confidence of zero. A hint is then sent by the first controller to the second controller, with the hint being of the form (volume, Next_LBA, confidence).

In step 3, upon receiving the hint of the form (volume, Next_LBA, confidence) from the first controller, the second controller determines if the confidence is greater than a specified threshold, denoted high_enough_confidence, indicative of a likely read stream, and if so performs one or more read-ahead operations for the likely read stream, as indicated in the figure. The second controller also inserts the received hint into its HINTS hash table with a timestamp, as follows: (key=(volume, Next_LBA), value=(confidence, timestamp=now)), where "now" denotes the current time.

In step 4, a background scanning process in each of the controllers periodically scans the entries of its HINTS hash table and removes old entries, as determined using the timestamps and/or other information.

It is to be appreciated that the particular example algorithm described above and illustrated by the pseudocode of FIG. 4 is presented by way of illustration only, and should not be construed as limiting in any way. Additional or alternative steps can be used, and the ordering of the steps can vary in other embodiments, possibly with each of one or more steps being performed at least in part in parallel with one or more other steps.

These and other embodiments disclosed herein provide significant advantages over conventional approaches.

For example, illustrative embodiments allow the storage nodes of a distributed storage system to more accurately and efficiently control their prefetching operations in the presence of a likely read stream, in a coordinated manner, thereby reducing unnecessary prefetching that might otherwise be performed based on false stream identification, and improving overall performance of the distributed storage system.

The disclosed techniques facilitate read stream identification and associated prefetching operations in scale-out storage systems and a wide variety of other types of distributed storage systems.

This advantageously allows better utilization of the available processing resources of each node and thereby improves the overall system performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed storage systems with read stream identification functionality will now be described in greater detail with reference to FIGS. 5 and 6. Although described in the context of system 100, these platforms may also be used to implement at least portions of other information processing systems in other embodiments.

Figure 5:
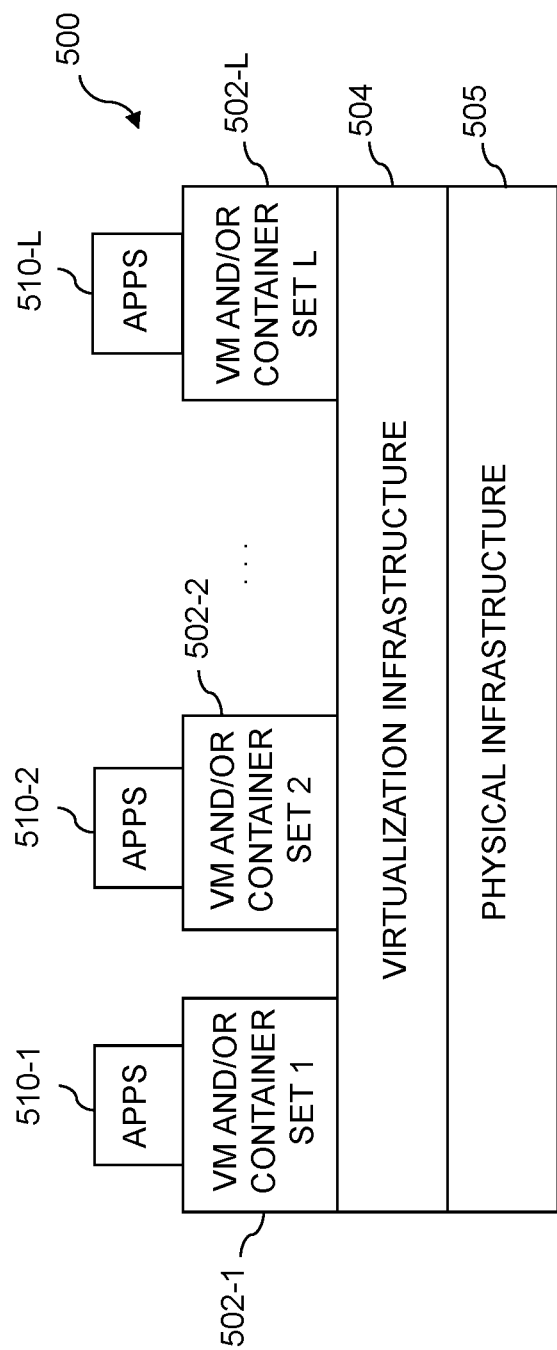
FIGS. 5 and 6 show examples of processing platforms that may be utilized to implement at least a portion of an information processing system in illustrative embodiments.
Figure 6:
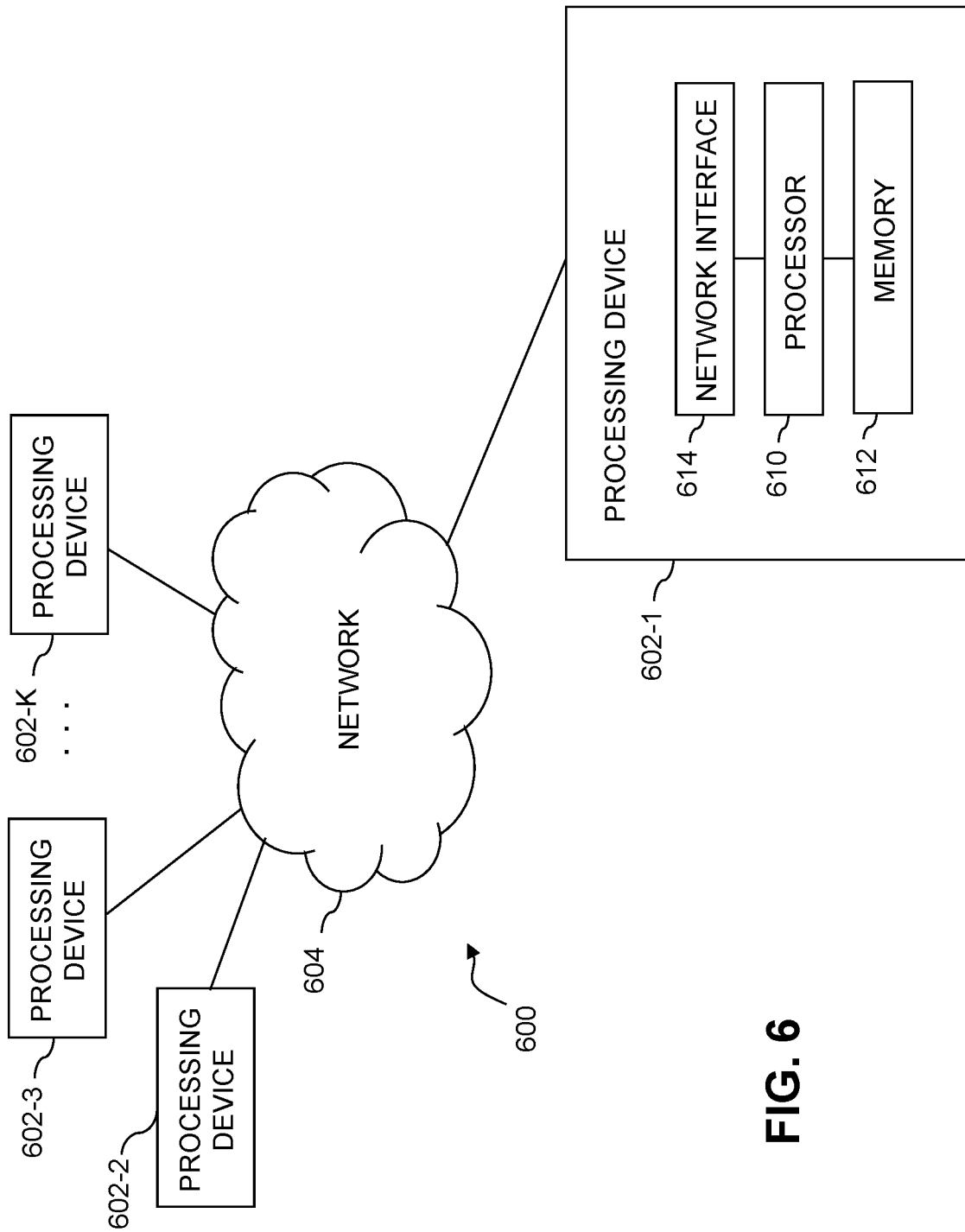

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide read stream identification functionality in a distributed storage system of the type described above using one or more processes running on a given one of the VMs. For example, each of the VMs can implement logic instances and/or other components for implementing functionality associated with read stream identification in the system 100.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide read stream identification functionality in a distributed storage system of the type described above. For example, a container host device supporting multiple containers of one or more container sets can implement logic instances and/or other components for implementing read stream identification functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the read stream identification functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, read stream identification logic instances, data structures and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least a first storage node of a plurality of storage nodes of a distributed storage system, the first storage node comprising a processor coupled to a memory;
    the first storage node being configured:
    to receive from a host device a read operation directed to a particular portion of a logical address space of the storage system, the logical address space being divided among the storage nodes;
    to determine that the read operation is potentially part of a stream of multiple read operations directed to respective particular portions of the logical address space;
    to send to at least a second one of the storage nodes an indication of the determination made by the first storage node; and
    to maintain a data structure having a plurality of entries, wherein the entries are indexed based at least in part on logical block addresses in the logical address space, and the entries comprise at least respective confidence values for corresponding portions of the logical address space, and further wherein determining that the read operation is potentially part of a stream of multiple read operations directed to respective particular portions of the logical address space comprises making the determination utilizing one or more of the entries of the data structure;
    wherein the data structure comprises a key-value data structure and a given entry of the data structure comprises (i) a key that is determined based at least in part on a logical storage volume identifier and a logical block address in the logical address space, and (ii) a corresponding one of the confidence values.

2. The apparatus of claim 1 wherein the logical address space is divided among the storage nodes in accordance with a specified sharding granularity in which different logical address space shards, each of a particular size given by the sharding granularity, are assigned to different ones of the storage nodes.

3. The apparatus of claim 2 wherein determining that the read operation is potentially part of the stream of read operations comprises determining that the read operation exhibits a predetermined relationship to the sharding granularity.

4. The apparatus of claim 3 wherein the predetermined relationship comprises the particular portion of the logical address space to which the read operation is directed having a size that is the same as the particular size given by the sharding granularity.

5. The apparatus of claim 1 wherein sending to at least a second one of the storage nodes an indication of the determination made by the first storage node comprises:
identifying the second storage node as a particular one of the storage nodes other than the first storage node that is assigned a next contiguous portion of the logical address space; and
sending the indication of the determination to the second storage node.

6. The apparatus of claim 1 wherein the indication of the determination made by the first storage node comprises a read stream identification hint generated by the first storage node for a next contiguous portion of the logical address space.

7. The apparatus of claim 1 wherein determining that the read operation is potentially part of a stream of multiple read operations directed to respective particular portions of the logical address space comprises:
identifying a next contiguous portion of the logical address space having a same size as the particular portion of the logical address space to which the read operation is directed; and
determining a confidence value for the next contiguous portion.

8. The apparatus of claim 7 wherein the indication sent to at least the second storage node comprises the confidence value determined for the next contiguous portion.

9. The apparatus of claim 7 wherein determining the confidence value comprises:
determining whether or not the next contiguous portion has a corresponding entry in the data structure maintained by the first storage node;
responsive to the next contiguous portion having a corresponding entry in the data structure, updating the confidence value and storing the updated confidence value in the corresponding entry; and
responsive to the next contiguous portion not having a corresponding entry in the data structure, creating a corresponding entry in the data structure, initializing the confidence value and storing the initialized confidence value in the corresponding entry.

10. The apparatus of claim 1 wherein the indication of the determination made by the first storage node is utilized in the second storage node to control prefetching of at least one of read metadata and read data in the second storage node.

11. The apparatus of claim 1 wherein the first storage node is further configured:

to receive from another one of the storage nodes an indication of a determination made by that other storage node that a read operation received by that other storage node is potentially part of a stream of multiple read operations directed to respective particular portions of the logical address space; and
to control prefetching of at least one of read metadata and read data in the first storage node based at least in part on the indication received from the other storage node.

12. The apparatus of claim 11 wherein controlling prefetching of at least one of read metadata and read data in the first storage node based at least in part on the indication received from the other storage node comprises:
comparing a confidence value in the indication received from the other storage node to a threshold; and
initiating the prefetching of at least one of read metadata and read data in the first storage node responsive to the confidence value exceeding the threshold.

13. The apparatus of claim 1 wherein determining that the read operation is potentially part of a stream of multiple read operations directed to respective particular portions of the logical address space comprises determining that the read operation is potentially part of a sequential stream of multiple read operations directed to respective contiguous portions of the logical address space.

14. A computer program product comprising a non-transitory processor-readable storage medium having stored therein program code of one or more software programs, wherein the program code when executed by a first storage node of a plurality of storage nodes of a distributed storage system, the first storage node comprising a processor coupled to a memory, causes the first storage node:
to receive from a host device a read operation directed to a particular portion of a logical address space of the storage system, the logical address space being divided among the storage nodes;
to determine that the read operation is potentially part of a stream of multiple read operations directed to respective particular portions of the logical address space;
to send to at least a second one of the storage nodes an indication of the determination made by the first storage node; and
to maintain a data structure having a plurality of entries, wherein the entries are indexed based at least in part on logical block addresses in the logical address space, and the entries comprise at least respective confidence values for corresponding portions of the logical address space, and further wherein determining that the read operation is potentially part of a stream of multiple read operations directed to respective particular portions of the logical address space comprises making the determination utilizing one or more of the entries of the data structure;
wherein the data structure comprises a key-value data structure and a given entry of the data structure comprises (i) a key that is determined based at least in part on a logical storage volume identifier and a logical block address in the logical address space, and (ii) a corresponding one of the confidence values.

15. The computer program product of claim 14 wherein determining that the read operation is potentially part of a stream of multiple read operations directed to respective particular portions of the logical address space comprises:
identifying a next contiguous portion of the logical address space having a same size as the particular portion of the logical address space to which the read operation is directed; and determining a confidence value for the next contiguous portion.

16. A method performed by a first storage node of a plurality of storage nodes of a distributed storage system, the first storage node comprising a processor coupled to a memory, the method comprising:
receiving from a host device a read operation directed to a particular portion of a logical address space of the storage system, the logical address space being divided among the storage nodes;
determining that the read operation is potentially part of a stream of multiple read operations directed to respective particular portions of the logical address space;
sending to at least a second one of the storage nodes an indication of the determination made by the first storage node; and
maintaining a data structure having a plurality of entries, wherein the entries are indexed based at least in part on logical block addresses in the logical address space, and the entries comprise at least respective confidence values for corresponding portions of the logical address space, and further wherein determining that the read operation is potentially part of a stream of multiple read operations directed to respective particular portions of the logical address space comprises making the determination utilizing one or more of the entries of the data structure;
wherein the data structure comprises a key-value data structure and a given entry of the data structure comprises (i) a key that is determined based at least in part on a logical storage volume identifier and a logical block address in the logical address space, and (ii) a corresponding one of the confidence values.

17. The method of claim 16 wherein determining that the read operation is potentially part of a stream of multiple read operations directed to respective particular portions of the logical address space comprises:
identifying a next contiguous portion of the logical address space having a same size as the particular portion of the logical address space to which the read operation is directed; and
determining a confidence value for the next contiguous portion.

18. The method of claim 17 wherein the indication sent to at least the second storage node comprises the confidence value determined for the next contiguous portion.

19. The method of claim 17 wherein determining the confidence value comprises:
determining whether or not the next contiguous portion has a corresponding entry in the data structure maintained by the first storage node;
responsive to the next contiguous portion having a corresponding entry in the data structure, updating the confidence value and storing the updated confidence value in the corresponding entry; and
responsive to the next contiguous portion not having a corresponding entry in the data structure, creating a corresponding entry in the data structure, initializing the confidence value and storing the initialized confidence value in the corresponding entry.

20. The method of claim 16 wherein the indication of the determination made by the first storage node is utilized in the second storage node to control prefetching of at least one of read metadata and read data in the second storage node.

* * * * *